(12) United States Patent
Crupi et al.

(10) Patent No.: US 8,768,878 B2
(45) Date of Patent: Jul. 1, 2014

(54) CHARACTERIZING BUSINESS INTELLIGENCE WORKLOADS

(75) Inventors: Gary W. Crupi, Pewaukee, WI (US);
Chon N. Lei, Poughkeepsie, NY (US);
Mei Hing Jackson, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 13/011,389

(22) Filed: Jan. 21, 2011

(65) Prior Publication Data

US 2012/0191641 A1 Jul. 26, 2012

(51) Int. Cl.
*G06F 17/30* (2006.01)

(52) U.S. Cl.
USPC .......................................... 707/602

(58) Field of Classification Search
USPC ............................ 707/602; 705/7.11; 718/105
See application file for complete search history.

(56) References Cited

U.S. PATENT DOCUMENTS

| | | | |
|---|---|---|---|
| 6,542,854 B2 | 4/2003 | Yang et al. | |
| 7,610,381 B2 | 10/2009 | Cherkasova et al. | |
| 2006/0253471 A1 | 11/2006 | Wasserman et al. | |
| 2006/0253472 A1 | 11/2006 | Wasserman et al. | |
| 2006/0259621 A1 | 11/2006 | Ranganathan et al. | |
| 2008/0120273 A1 | 5/2008 | Ramesh et al. | |
| 2008/0134192 A1 | 6/2008 | Alford | |
| 2008/0221941 A1 | 9/2008 | Cherkasova et al. | |

OTHER PUBLICATIONS

Mell, P., et al., "The NIST Definition of Cloud Computing," Version 15, Oct. 7, 2009, National Institute of Standards and Technology, Information Technology Laboratory.
Fitch, J., "SCON, OEM Sever Consolidation onto IBM System Z, Capacity Planning Tool, User's Guide", May 19, 2008, pp. 1-19, IBM Sales & Distribution, STG Sales, Advanced Technical Support (ATS), Washington Systems Center (WSC).

*Primary Examiner* — Huawen Peng
(74) *Attorney, Agent, or Firm* — Fleit Gibbons Gutman Bongini & Bianco PL; Thomas Grzesik

(57) ABSTRACT

One or more embodiments characterize workloads in a data warehouse system. A set of accounting data associated with a data warehouse system comprising at least one database is collected. A set of query concurrency information associated with the database is determined determining based on the set of accounting data. The set of query concurrency information identifies a plurality of queries executed on the database simultaneously and a duration of this execution. A set of processor utilization distribution information associated with the plurality of queries is determined based on the set of accounting data. A set of data access information indicating a quantity of data accessed by each query in the plurality of queries is determined. A workload profile associated with the database is generated based on the set of query concurrency information, the set of processor utilization distribution information, and the set of data access information.

19 Claims, 9 Drawing Sheets

CHARACTERIZING BUSINESS INTELLIGENCE WORKLOADS

BACKGROUND

The present invention generally relates to databases, and more particularly relates to characterizing workloads associated with databases.

Data warehouse and business intelligence workloads vary widely across customer implementations. The ad-hoc and scheduled work that enters the system is the root of the workload variation. Random numbers of users, data set size, and Structured Query Language (SQL) query complexity all contribute to the unpredictability. This results in effectively estimating and configuring the appropriate amount of hardware for the supporting database a difficult task. If the solution is undersized, the customer may suffer poor performance and possibly missed service level agreements (SLAs). In certain situations, this might force the provider to supply additional capacity for free. If oversized, the customer is left dissatisfied having spent more money than was necessary for the solution. In either case, when resource estimates are off target, customers are not happy.

BRIEF SUMMARY

In one embodiment, a method for characterizing workloads in a data warehouse system is disclosed. The method comprises collecting a set of accounting data associated with a data warehouse system comprising at least one database. A set of query concurrency information associated with the database is determined based on the set of accounting data. The set of query concurrency information identifies a plurality of queries simultaneously executed on the database and a duration of this execution. A set of processor utilization distribution information associated with the plurality of queries is determined based on the set of accounting data. A set of data access information indicating a quantity of data accessed by each query in the plurality of queries is determined based on the set of accounting data. A workload profile associated with the database is generated based on the set of query concurrency information, the set of processor utilization distribution information, and the set of data access information.

In another embodiment, a system for characterizing workloads in a data warehouse system is disclosed. The system comprises a memory and a processor that is communicatively coupled to the memory. A workload characterizer is communicatively coupled to the memory and processor. The workload characterizer is configured to perform a method. The method comprises collecting a set of accounting data associated with a data warehouse system comprising at least one database. A set of query concurrency information associated with the database is determined based on the set of accounting data. The set of query concurrency information identifies a plurality of queries executed on the database simultaneously and a duration of this execution. A set of processor utilization distribution information associated with the plurality of queries is determined based on the set of accounting data. A set of data access information indicating a quantity of data accessed by each query in the plurality of queries is determined based on the set of accounting data. A workload profile associated with the database is generated based on the set of query concurrency information, the set of processor utilization distribution information, and the set of data access information.

In another embodiment, a computer program product for characterizing workloads in a data warehouse system is disclosed. The computer program product comprises a non-transitory storage medium readable by a processing circuit and storing instructions for execution by the processing circuit for performing a method. The method comprises collecting a set of accounting data associated with a data warehouse system comprising at least one database. A set of query concurrency information associated with the database is determined based on the set of accounting data. The set of query concurrency information identifies a plurality of queries executed on the database simultaneously and a duration of this execution. A set of processor utilization distribution information associated with the plurality of queries is determined based on the set of accounting data. A set of data access information indicating a quantity of data accessed by each query in the plurality of queries is determined based on the set of accounting data. A workload profile associated with the database is generated based on the set of query concurrency information, the set of processor utilization distribution information, and the set of data access information.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
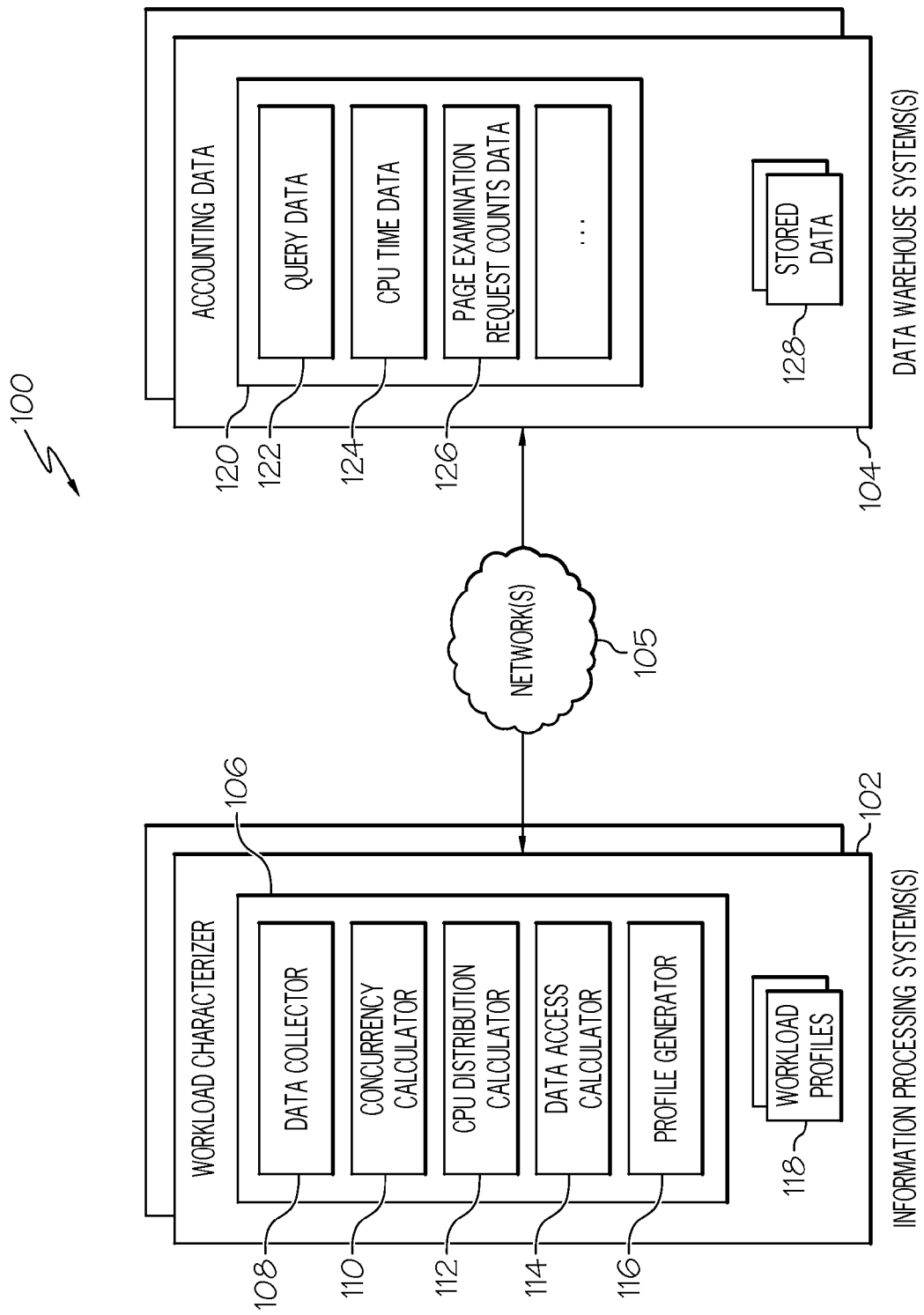
FIG. 1 is a block diagram illustrating one example of an operating environment according to one embodiment of the present invention.

As discussed above, data warehouse and business intelligence workloads vary widely across customer implementations. Therefore, effectively estimating and configuring the appropriate amount of hardware for the supporting database is a difficult task. Conventional methods characterizing workloads are generally inaccurate. For example, some conventional methods utilize simple rules of thumb (ROTs) to address the problem by suggesting a set amount of processing capacity per unit of raw data. For example, 400 MIPS per terabyte of raw data is a commonly used ROT for sizing some warehouse systems. This approach is based on anecdotal experiences, single customer workloads, or intuition. This approach is generally applied too broadly and rarely inspires a high level of confidence due to its overly simplistic and unverifiable foundation.

Other conventional methods take an additional step by using workload profile input from the customer. This approach suffers from the inability of customers to accurately answer the questions about their workload's characteristics. Even if the questions are answered accurately, the mathematical algorithm used by the tool is inadequate. First, it is based on a very small number of queries. To create a resource estimation tool that can fit many workload scenarios, a broader view is needed. Second, the data points used to create the internal model are from tests conducted at a single scale factor. Its assumption of processing linearity does not accurately portray what might happen differently at very low or high end scale factors. While the tool attempts to be more scientific in its approach by factoring more input than the ROT method, it misses the goal without accurate inputs and a wide variety of data points to verify the processing assumptions.

Other methods take an entirely different approach to sizing existing, competitive workloads. The raw capacity required by the competitive solution is converted to similar capacity on the target platform using relative capacity information created by a third party. This method ignores the differences between the underlying platform processing models, synergy of the solution stack, and the workload characteristics. As a result, the estimates created may not fit the target scenario.

Even further, some methods for business intelligence workload characterization are based on measurement data derived from synthetic workloads. An example is the workload used in the industry standard TPC-H benchmark. A small number of test cases are normally used to deliver generalizations of production workloads which exhibit a wide spectrum of performance characteristics. This leads to grossly inaccurate estimates in many situations.

Therefore, one or more embodiments of the present invention provide an advantageous way to collect and profile workloads, which is needed to enhance sizing tools and estimation processes that may be incorporated in other processes including but not limited to workload scheduling and capacity planning. Various embodiments provide a better understanding of the workloads in terms of CPU consumption, percentage of the total data that is accessed by the SQL, and user concurrency. For example, one or more embodiments of the present invention accurately reflect the production workload characteristics by collecting data from many production systems and organizing this data into a collection of profiles. Each profile comprises of a set of metrics that reflects the distribution of CPU consumption of queries, the concurrency of queries at a given time, and the quantity of data accessed by the queries. Looking at a variety of customer workloads in these terms helps pinpoint the most accurate answer. When assembled, these profiles provide a powerful picture that can be the foundation for an accurate sizing tool.

Operating Environment

FIG. 1 illustrates one example of an operating environment 100 applicable to one or more embodiments of the present invention. In particular, FIG. 1 shows one or more information processing systems 102 and one or more data warehouse systems 104 communicatively coupled to one or more networks 105. The network(s) 105, in this embodiment, can be a wide area network, local area network, wired network, wireless network, and/or the like.

The information processing system 102 comprises a workload characterizer 106. The workload characterizer 106, in one embodiment, comprises a data collector 108, a concurrency calculator 110, a CPU distribution calculator 112, a data access calculator 114, and a profile generator 116. The workload characterizer 106 uses these components to collect data from the data warehouse system 104 and organize this data into a collection of profiles 118. For example, the data warehouse system 104 comprises various types of accounting data 120 such as, but not limited to, query data 122, CPU time data 124, page request count data 126, and the like that is associated with data 128 stored at the data warehouse system 104. The workload characterizer 106 uses this data to generate the workload profiles 118. As will be discussed in greater detail below, each profile 118 comprises of a set of metrics that reflects the distribution of CPU consumption of queries, the concurrency of queries at a given time, and the quantity of data accessed by queries associated with the data 128 stored at the data warehouse system 104.

Data Collection

With respect to data collection, the workload characterizer 106, via the data collector 108, collects various types of accounting data 120. This accounting data 120 is maintained by the data warehouse system 104 for performance analysis and charge back purposes. The types of data collected by the data collector 108 are query data 122 such as query start/end times and the number of concurrent queries, CPU time data 124 such as CPU times during query execution, and page request count data 126, which is used to calculate data access quantity at a query level. However, other types of data can be collected as well.

The data collector 108, in one embodiment, collects the above data during the busy intervals of the day. For example, if the objective is to estimate maximum resource requirements, then data is captured during peak periods. The data collector 108 also captures data across multiple days so that variations during a week can be identified. Capturing data across weeks and months serves the purpose of capacity planning since trends of workload growth can be identified. In some instances, data of a specific time frame is of special interest. For example, the day after quarterly sales data becomes available may present an unusually high amount of query activities, and an installation may be particularly interested in profiling the queries running that day.

Query Concurrency

Once the workload characterizer 106 has collected the above data the characterizer 106 then performs various calculations on this data such as query concurrency, CPU distribution, and data access calculations. The workload characterizer 106, via the concurrency calculator 110, utilizes the query data 122 that has been collected to determine currency metrics. For example, each query has a start time and an end time. This information is generally available in the trace data of a database system, such as the IBM's DB2® Accounting data stored in system management facilities (SMF) data sets on IBM's System z®. For each query, the concurrency calculator 110 plots a line in a time series graph to depict the start and end times of the execution of the query. Time spent in waiting prior to execution is not relevant to the calculation. The concurrency calculator 110 cycles through the accounting records 120 in the time period of interest so that a line is plotted for each query.

Figure 2:
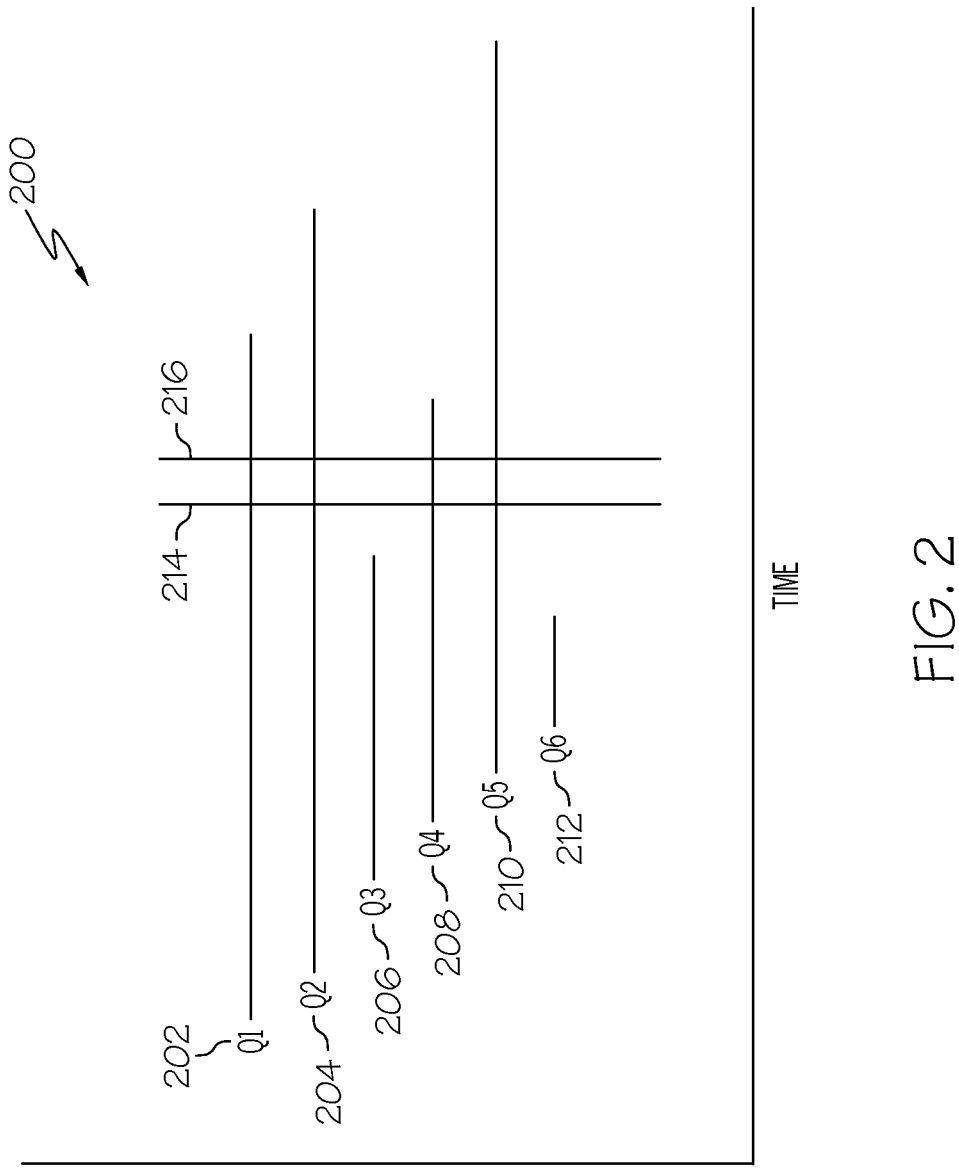
FIG. 2 is a graph illustrating query start and end time according to one embodiment of the present invention.

FIG. 2 shows one example of a time series graph 200 that depicts the start and end times of the execution of a plurality of queries. As can be seen in FIG. 2, there are six queries 202, 204, 206, 208, 210, 212 found in the system 104 with different start and end times. Concurrency level at the time interval as defined by the boundary between the two vertical lines 214, 216 shows a value of four (there are four queries that intersect these lines 214, 216). The period of time bounded by the two vertical lines represents the smallest unit of time of interest for the analysis. It should be noted that there is not any one definition that fits all data warehouse systems. For those systems with many short queries, a shorter interval measured in seconds may be appropriate. For systems dominated by medium and large queries, a longer interval lasting minutes can be used.

Figure 3:
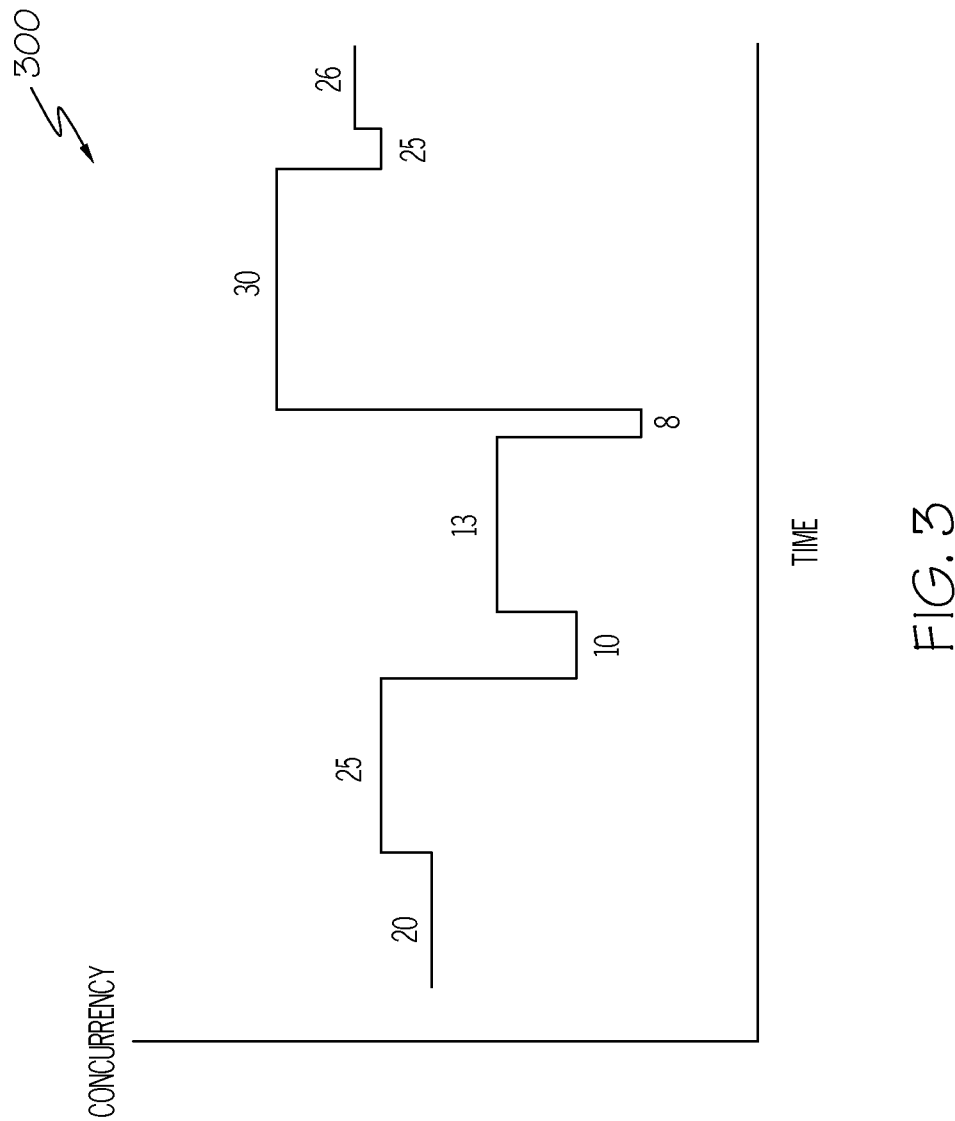
FIG. 3 is a graph illustrating query concurrency in a data warehouse system according to one embodiment of the present invention.

Once concurrency is determined for a unit of time, the process can be repeated to capture the concurrency levels across a time period, as shown in graph 300 of FIG. 3. For example, FIG. 3 shows that query concurrency starts at 20 queries, rises to 25 queries, then drops to 10 queries, changes levels several times, and eventually ends at 26 queries. Not only is the concurrency level an important metric, the duration of concurrency is also of great essence. The concurrency level of 10 is of little interest, since the system 104 spends a very short period of time running the 10 queries simultaneously. On the other hand, the system 104 executes 30 queries for a relatively long interval. This is usually more significant because the interval reflects a higher level of system resource consumption over a long duration. It is important that an underlying system has sufficient resources to sustain the demand.

On example of how the concurrency calculator 110 calculates concurrency is as follows. In this embodiment, the concurrency calculator 110 analyzes the accounting data 120 such as the query data 122 of the data warehouse system 104. Starting at time zero (T0), the concurrency calculator 110 determines the number of concurrent queries by counting the number of queries with their start times smaller than T0 and their end times bigger than T0. The concurrency calculator 110 then advances the time to the next time unit (T1). In general, the interval between T0 and T1 is relatively short. The concurrency calculator 110 repeats the same calculation by finding the number of queries with their start times less than T1 and their end times bigger than T1. When all the data points have been examined, a graph similar to the graph 300 of FIG. 3 is constructed by the concurrency calculator 110 that depicts the concurrency level of the workload. The performance of this algorithm used by the concurrency calculator 110 can be increased by sorting the start and end times of all queries prior to calculation. Similarly, implementation of this algorithm can be facilitated by storing the accounting data 120 in a relational database.

CPU Distribution

With respect to the CPU distribution calculation mentioned above, the accounting data 120 captures a vast amount of information. Not only are the start and the end times of queries captured, data 124 regarding CPU (processor) access times during execution is also captured. Collecting CPU time of each query enables a profile 118 that captures the distribution of CPU consumption of queries to be built. The work characterizer 106, via the CPU distribution calculator 112, computes CPU distribution by sorting all CPU data entries in query order. In the situation where a query runs with multiple tasks, the CPU times are aggregated across all the tasks. In some instances, a query may have a portion of its work consuming cycles of specialty engines, such as the System z Integrated Information Processors (zIIPs). Therefore, this characteristic can also be taken into account as well. Next, the CPU distribution calculator 112 records the CPU time consumed by the query. After this is completed for all queries, the CPU distribution calculator 112 then counts the number of queries in the data file and sorts the entries by CPU time which positions at a certain percentile. For example, if there is a total of 100 queries, then the CPU time of the query in the 30th position after sorting is used to depict the 30th percentile of the number of queries executed with this CPU time or less. This process is then repeated for other percentile boundaries, such as at 10%, 25%, 75%, 90%, and 100%.

With the above calculation, a cumulative distribution table can now be constructed by the CPU distribution calculator 112, as shown below in TABLE 1. Distribution data delivers a vastly superior model than the traditional small/medium/large query sizing technique. With finely granular percentile boundaries, a significantly more accurate resource estimation tool can be constructed. It is important to understand the intensity of the workload at various resource consumption levels. For the period of time under analysis, query concurrency can be combined with CPU consumption distribution to gain additional insight into the workload. For example, for time X with 50 concurrent queries, at query completion, 50% of the executing queries or 25 queries consumed 0.05 second of CPU time or less, 25% of the queries or 12 queries consumed between 0.05 second and 1 minute of CPU time, approximately 15% or 8 queries consumed between 1 and 3 minutes of CPU time, and 5 queries consumed between 3 and 10 minutes of CPU time. (Referring to data in Table 1)

TABLE 1

| Cumulative Query Count % | $\leq$=10% | >10% $\leq$=25% | >25% $\leq$=50% | >50% $\leq$=75% | >75% $\leq$=90% | >90% $\leq$=100% |
|---|---|---|---|---|---|---|
| # Queries | 5 | 7 | 13 | 12 | 8 | 5 |
| CPU Consumption | $\leq$=.001 second | >.001 $\leq$=.01 second | >.01 $\leq$=.05 second | >.5 $\leq$=1 minute | >1 $\leq$=3 minutes | $\leq$=10 minutes |

Data Access

With respect to the data access calculation mentioned above, the quantity of data accessed by a query determines the amount of CPU processing required. Many existing resource estimation tools make some educated guess of the data access percentage. However, this invariably leads to a wide deviation from the actual requirement. The accounting data 120 maintained by the data warehouse system 104 includes page request count data 126. One example of a page request is a getpage. This is a request by IBM's DB2® to examine the contents of a database page. Similar metrics exist in other database platforms. With this metric, the workload characterizer 106, via the data access calculator 114, calculates data access quantity at a query level.

Figure 6:
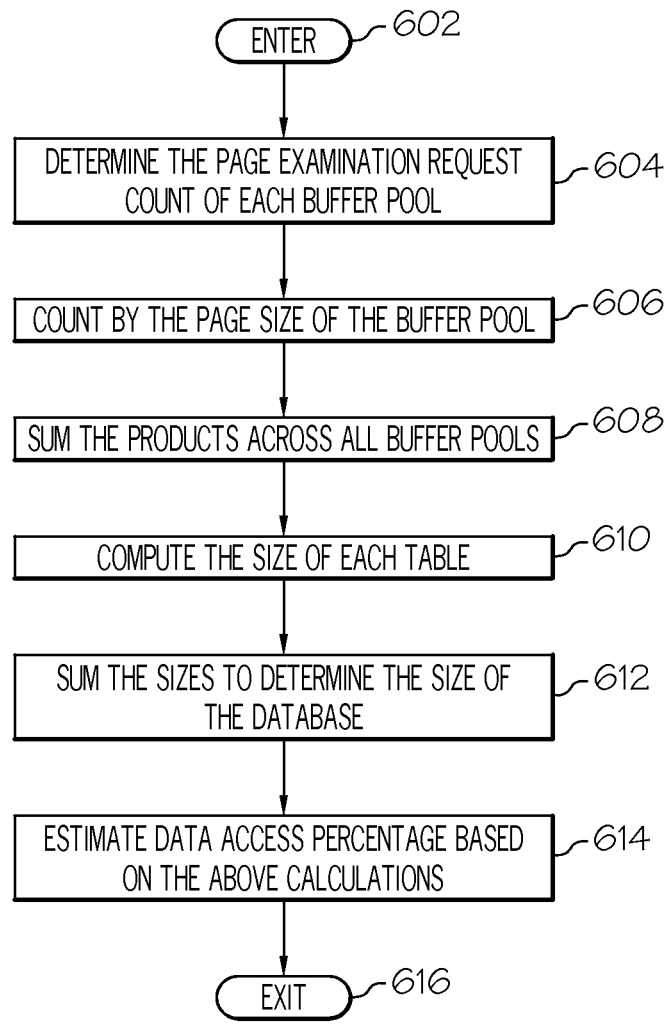
FIG. 6 is an operational flow diagram illustrating one example of calculating data access percentage for a query in a data warehouse system and is done for each query to be profiled according to one embodiment of the present invention.

For example, using FIG. 6, the data access calculator 114 starts by noting the page request count of each buffer pool for each query to be in the workload profile. A buffer pool is an area of memory used by the (Database Management System) DMBS to cache data and indexes. Each request count is then multiplied by the page size of the buffer pool to obtain a product for that buffer pool. The products are then summed across all buffer pools for each query to obtain the data accessed by that query. In general, a separate buffer pool is designated for sort work files. The examination request count of this buffer pool, in one embodiment, is not be used in the calculation because it does not represent accesses to the user data tables or indexes.

Next, the data access calculator 114 computes the size of each table. In the case of IBM's DB2®, the number of pages of a table containing user data (versus unused, but allocated pages) is captured as NACTIVEF (number of active pages) in the catalog. Other or similar metrics in other database platforms can be used as well. The data access calculator 114 then multiples the number of active pages value by the page size of the table to obtain a product for that table.

The data access calculator 114 then sums the products across all tables to determine the size of the database. Index pages, in one embodiment, are not considered because data access percentage is generally based on table data only. This is most relevant during resource estimation for a new application when the database has not been constructed. Customers can project the size of the new database by estimating the number of rows in the tables.

Data access percentage is approximated by:

$$\frac{\sum_i (\text{bufferpool}_i\_\text{getpages} \times \text{page\_size}_i)}{\sum_j (\text{table}_j\_\text{pages} \times \text{page\_size}_j)} \quad (\text{EQ 1})$$

where $\text{table}_j\_\text{pages}$ for a particular table j can be determined from the corresponding number of active pages (NACTIVEF) value in the catalog. All buffer pools, in one embodiment, are used in the calculation except the sort work buffer pool. This formula is applicable to compressed as well as uncompressed data. In one embodiment, this formula delivers more accurate results when the data is uncompressed. For compressed data, accuracy improves when most of the accessed pages are coming from tables. If compression ratios are available for each table and each object (tables and indexes) is assigned to its own buffer pool, then a more accurate formula can be used such as.

$$\frac{\sum_i \left(\frac{\text{table\_bufferpool}_i\_\text{getpages} \times \text{page\_size}_i}{\text{compression\_ratio}_i}\right) +}{\sum_k \left(\frac{\text{table}_k\_\text{pages} \times \text{page\_size}_k}{\text{compression\_ratio}_k}\right)} \quad (\text{EQ 2})$$

Profile Constructions

Once the above calculations (query concurrency, CPU distribution, and data access calculations) have been performed, the workload characterizer 106, via the profile generator 116, creates one or more workload profiles 118 that comprise a set of metrics that reflects the distribution of CPU consumption of queries, the concurrency of queries at a given time, and the quantity of data accessed by the queries. In other words, a profile 118 comprises data from the previous three calculation phases all done over the same period of time. These profiles 118 can then be selected to perform resource estimation calculations. If the proposed application demands unusual performance requirements, it may be necessary to select components from different profiles for the calculations.

Although not necessary, it can be beneficial to store the data in a database so that analysis of data could be performed quickly. For example, calculations such as the percentage of time during prime shift with a concurrency level of higher than 30 can be completed easily. Also, a vendor may have access to multiple customer profiles 118. Storing these profiles 118 in a database makes it easier to contrast the difference in query characteristics among customers. Once profile data becomes available, resource estimation can be performed with a higher degree of accuracy. Inputs to a resource estimation tool comprise raw data size and query characteristics, which typically are made up of query categories, their throughput rates, and average data access/query by category.

As can be seen from the above discussion, one or more embodiments of the present invention provide an advantageous way to collect and profile workloads that enhances sizing tools and estimation processes. Various embodiments provide a better understanding of the workloads in terms of CPU consumption, percentage of the total data that is accessed by the SQL, and user concurrency. For example, one or more embodiments of the present invention accurately reflect the production workload characteristics by collecting data from many production systems and organizing this data into a collection of profiles. Each profile comprises of a set of metrics that reflects the distribution of CPU consumption of queries, the concurrency of queries at a given time, and the quantity of data accessed by the queries. Looking at a variety of customer workloads in these terms helps pinpoint the most accurate answer. When assembled, these profiles provide a powerful picture that can be the foundation for an accurate resource estimation tool.

Figure 4:
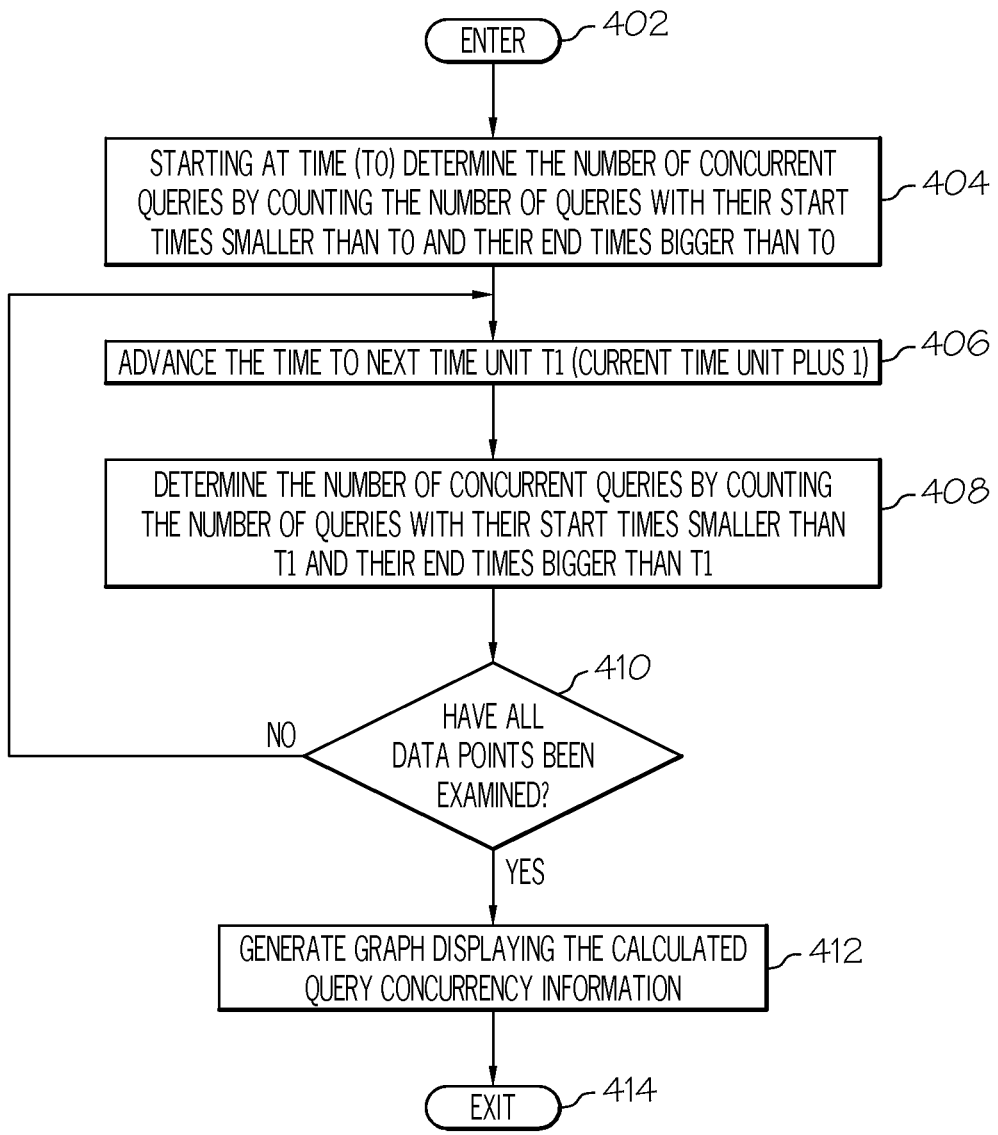
FIG. 4 is an operational flow diagram illustrating one example of calculating query concurrency in a data warehouse system according to one embodiment of the present invention.

FIG. 4 is an operational flow diagram illustrating one example of calculating query concurrency in a data warehouse system for an identified period of time. The operational flow diagram of FIG. 4 begins at step 402 and flows directly to step 404. The workload characterizer 106, at step 404, starting at time zero (T0) and determines the number of concurrent queries by counting the number of queries with their start times smaller than T0 and their end times bigger than T0. The workload characterizer 106, at step 406, then advances the time to the next time unit (T1). The workload characterizer 106, at step 408, then repeats the same calculation by finding the number of queries with their start times less than T1 and their end times bigger than T1. The workload characterizer 106, at step 410, determines if all data points have been examined. If the result of this determination is negative, the control flow returns to step 406. If the result of this determination is positive, the workload characterizer 106, at step 412, generates a graph displaying the calculated query concurrency for the given data warehouse 104. The control flow then exits at step 414.

Figure 5:
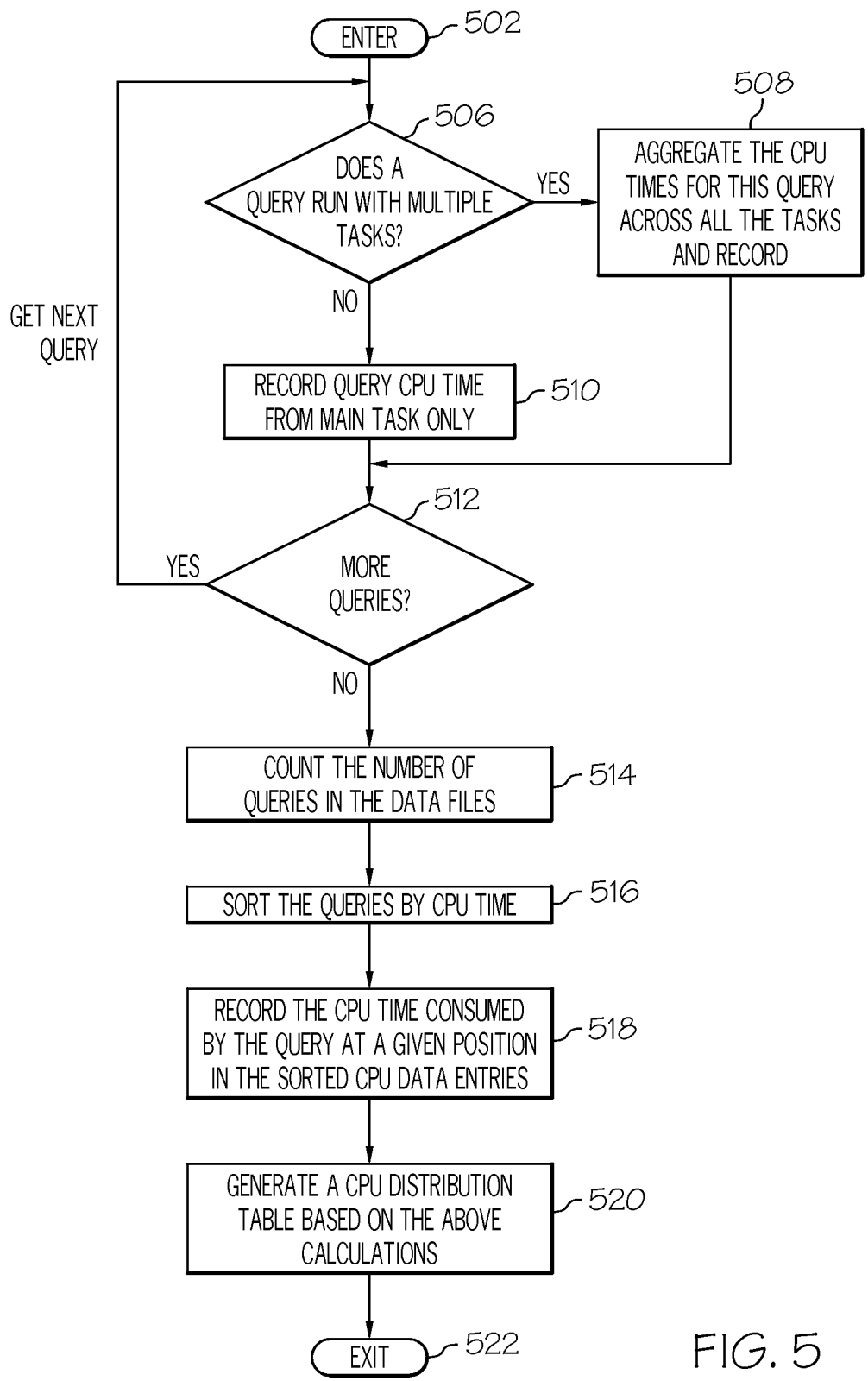
FIG. 5 is an operational flow diagram illustrating one example of calculating CPU distribution time for queries in a data warehouse system according to one embodiment of the present invention.

FIG. 5 is an operational flow diagram illustrating one example of calculating CPU distribution in a data warehouse system from an accounting query data file with CPU entries for the same identified period of time. The operational flow diagram of FIG. 5 begins at step 502 to examine the accounting data 120 and flows directly to step 506. The workload characterizer 106, at step 506, determines if a given query runs with multiple tasks. If the result of this determination is positive, the workload characterizer 106, at step 508, aggregates the CPU times for this given query across all tasks and records the aggregated CPU for the given query. If the result of this situation is negative, the single CPU entry is recorded at step 510. The control at step 512 then loops back to the next query in step 506 and steps 508 and 510 are repeated until total CPU times for each query are recorded. The workload characterizer 106, at step 514 counts the number of queries in the accounting data 120. The workload characterizer 106, at step 516, sorts the queries, each with total CPU time consumed, by CPU time, which positions at a certain percentile at step 518. For example, if there is a total of 100 queries for the study time period, then the CPU time Z of the query in the 30th position after sorting is used to depict the 30th percentile of queries that executed with Z time units or less. This process is then repeated for other percentile boundaries, such as at 10%, 25%, 75%, 90%, and 95%. The workload characterizer 106, at step 514, then generates a cumulative distribution table based on the above information. The control flow then exits at step 522.

FIG. 6 is an operational flow diagram illustrating one example of calculating data access in a data warehouse system. The operational flow diagram of FIG. 6 begins at step 602 and flows directly to step 604. The workload characterizer 106, at step 604, determines the page request count of each buffer pool for each query. The workload characterizer 106, at step 606, multiplies each page request count by the page size of the buffer pool. The workload characterizer 106, at step 608, sums the products of step 606 across all buffer pools. The workload characterizer 106, at step 610, computes the size of each table in the database of the data warehouse 104. The workload characterizer 106, at step 612, sums the sizes to determine the size of the database. The workload characterizer 106, at step 614, estimates the data access percentage of a query based on the above calculations using the EQ 1 and EQ 2 discussed above. The control flow then exits at step 616. Based on the calculations performed in FIGS. 4-6 the workload characterizer 106 creates the workload profiles 118, as discussed above.

Figure 7:
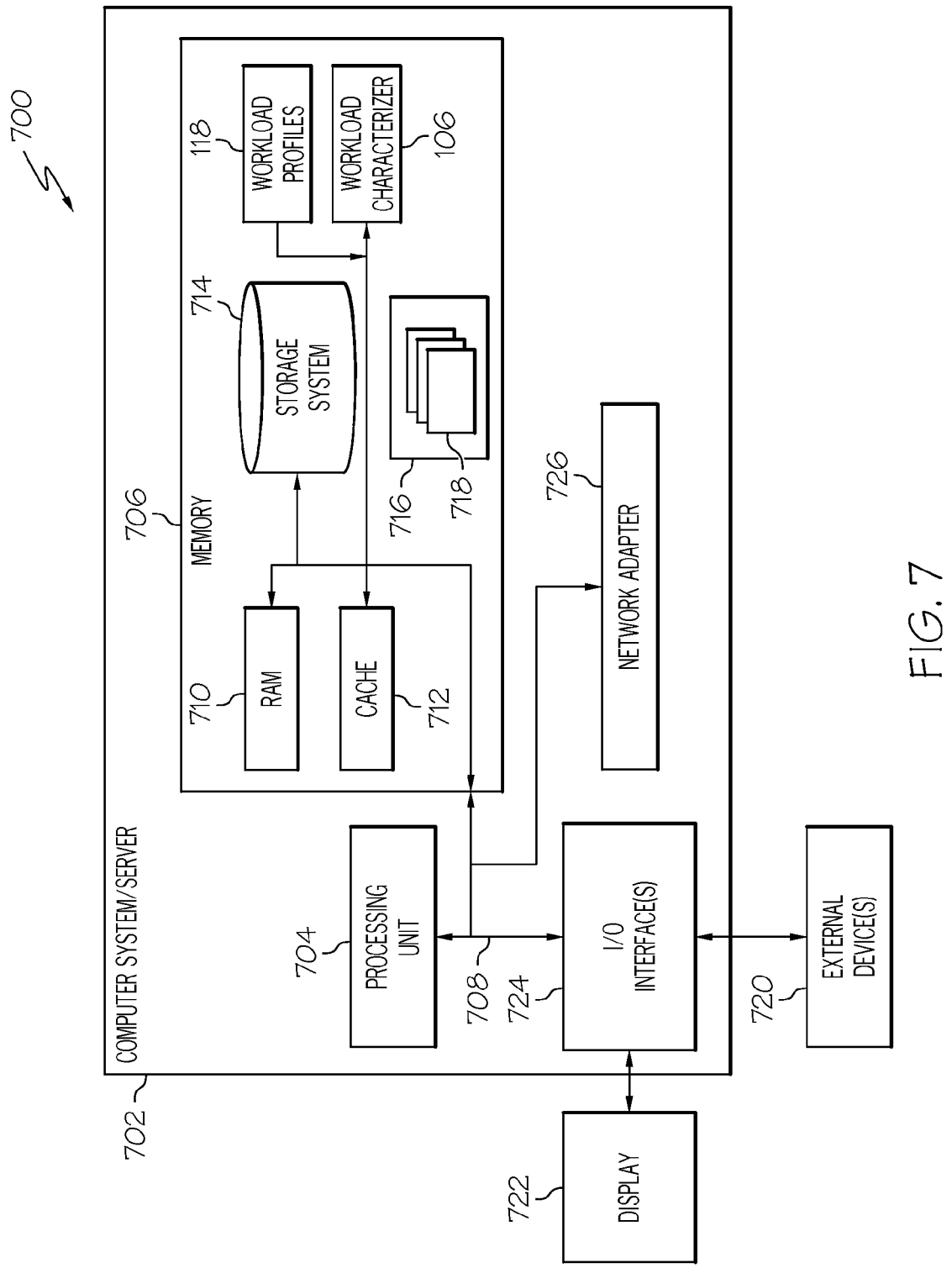
FIG. 7 illustrates one example of a cloud computing node according to one embodiment of the present invention.

Referring now to FIG. 7, a schematic of an example of an information processing system 700 such as the information processing system 102 of FIG. 1. In one embodiment, the information processing system 700 is a cloud computing node. Cloud computing node 700 is only one example of a suitable cloud computing node and is not intended to suggest any limitation as to the scope of use or functionality of embodiments of the invention described herein. Regardless, cloud computing node 700 is capable of being implemented and/or performing any of the functionality set forth hereinabove.

In cloud computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus 708 that couples various system components including system memory 706 to processor 704.

Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706, in one embodiment, comprises the work load characterizer 106 and its components and the workload profiles 128. The work load characterizer 106 can also be implemented in hardware as well. The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of embodiments of the invention as described herein.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Cloud Environment

It is understood in advance that although the following is a detailed discussion on cloud computing, implementation of the teachings recited herein are not limited to a cloud computing environment. Rather, various embodiments of the present invention are capable of being implemented in conjunction with any other type of computing environment now known or later developed. For example, various embodiments of the present invention are applicable to any computing environment with a virtualized infrastructure or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present invention are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
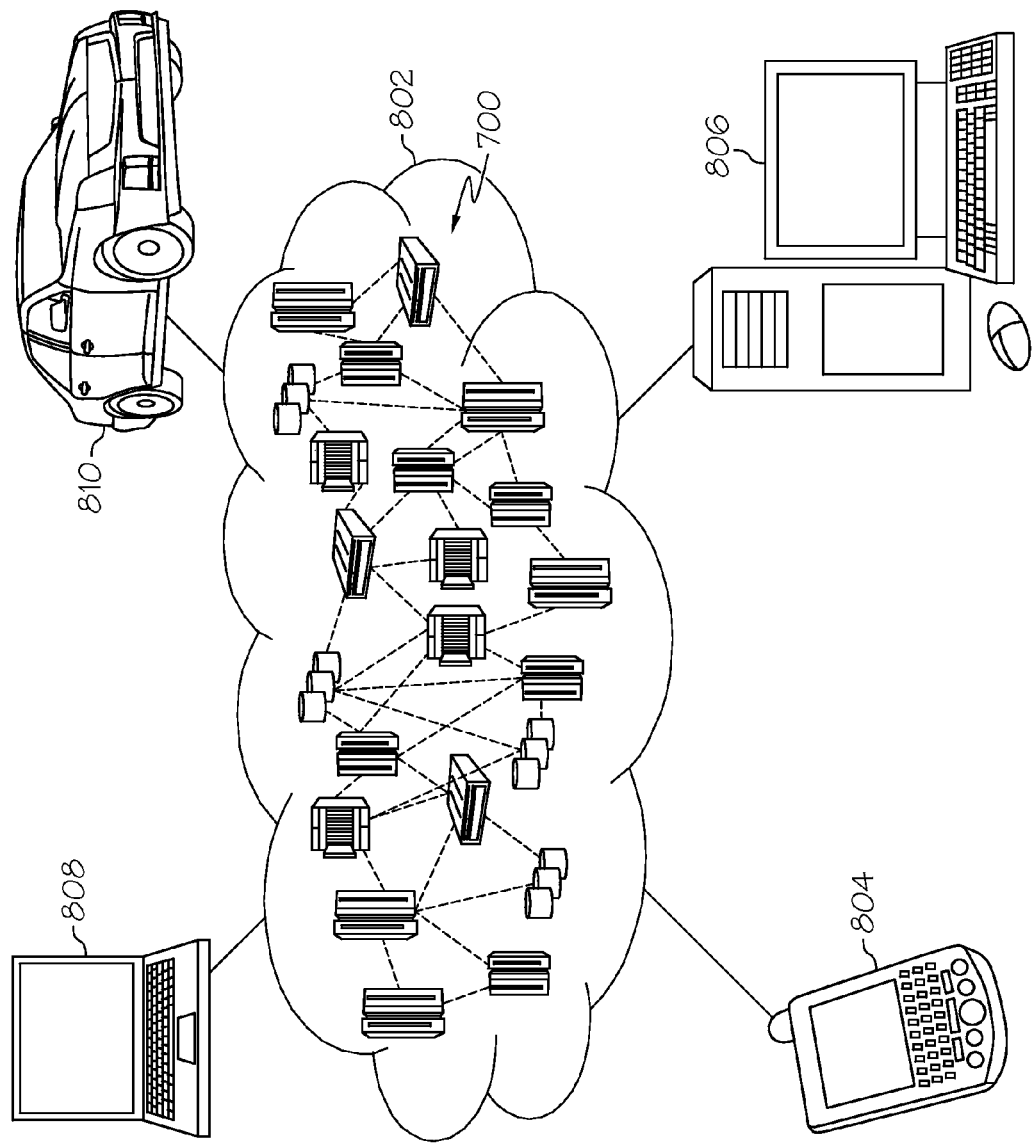
FIG. 8 illustrates one example of a cloud computing environment according to one example of the present invention.

Referring now to FIG. 8, illustrative cloud computing environment 802 is depicted. As shown, cloud computing environment 802 comprises one or more cloud computing nodes 700 with which local computing devices used by cloud consumers, such as, for example, personal digital assistant (PDA) or cellular telephone 804, desktop computer 806, laptop computer 808, and/or automobile computer system 810 may communicate. Nodes 804, 806, 806, 810 can communicate with one another. They may be grouped (not shown) physically or virtually, in one or more networks, such as Private, Community, Public, or Hybrid clouds as described hereinabove, or a combination thereof. This allows cloud computing environment 802 to offer infrastructure, platforms and/or software as services for which a cloud consumer does not need to maintain resources on a local computing device. It is understood that the types of computing devices 804, 806, 808, 810 shown in FIG. 8 are intended to be illustrative only and that computing nodes 700 and cloud computing environment 802 can communicate with any type of computerized device over any type of network and/or network addressable connection (e.g., using a web browser).

Figure 9:
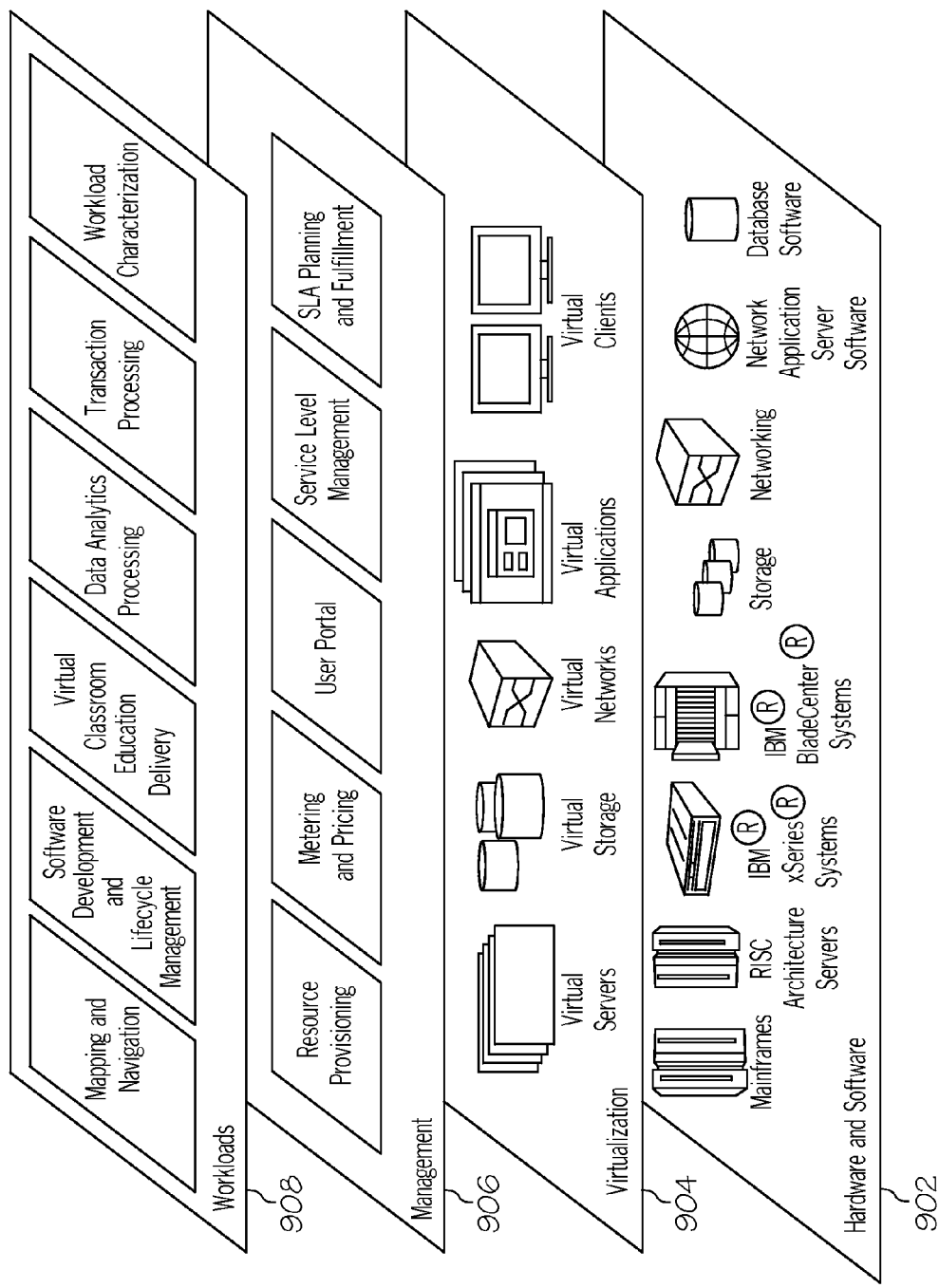
FIG. 9 illustrates abstraction model layers according to one example of the present invention.

Referring now to FIG. 9, a set of functional abstraction layers provided by cloud computing environment 802 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 902 includes hardware and software components. Examples of hardware components include mainframes, in one example IBM® System z® systems; RISC (Reduced Instruction Set Computer) architecture based servers, in one example IBM System p® systems; IBM System x® systems; IBM BladeCenter® systems; storage devices; networks and networking components. Examples of software components include network application server software, in one example IBM WebSphere® application server software; and database software, in one example IBM DB2® database software. (IBM, System z, System p, System x, BladeCenter, WebSphere, and DB2 are trademarks of International Business Machines Corporation registered in many jurisdictions worldwide)

Virtualization layer 904 provides an abstraction layer from which the following examples of virtual entities may be provided: virtual servers; virtual storage; virtual networks, including virtual private networks; virtual applications and operating systems; and virtual clients.

In one example, management layer 906 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 908 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload characterization, as discussed above.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages: The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for characterizing workloads in a data warehouse system, the method comprising:
    executing with a processor on an information processing system the following:
    collecting a set of accounting data associated with a data warehouse system comprising at least one database;
    determining, based on the set of accounting data, a set of query concurrency information associated with the database, the set of query concurrency information identifying, for a plurality of queries and for each of a plurality of time units over a period of time, a number of queries executed on the database simultaneously and a duration of execution of such queries, wherein the set of query concurrency information is determined based on at least comparing a start and end time of each query in the plurality of queries against each a start and end time of each remaining query in the plurality of queries;
    determining, based on the set of accounting data, a set of processor utilization distribution information associated with the plurality of queries;
    determining, based on the set of accounting data, a set of data access information indicating a quantity of data accessed by each query in the plurality of queries; and
    generating a workload profile associated with the database based on the set of query concurrency information, the set of processor utilization distribution information, and the set of data access information.

2. The method of claim 1, wherein determining the set of query concurrency information further comprises:
    counting a number of queries with start times smaller than a given first time unit and with end times larger than the first time unit.

3. The method of claim 1, wherein determining the set of processor utilization distribution information comprises:
    determining, for each query, a processor access time associated with such query; and
    creating a sorted list comprising each of the processor access times, wherein each position of the sorted list corresponds to a processor utilization distribution percentile.

4. The method of claim 1, wherein determining the set of data access information comprises at least:
    recording a set of page request counts for each query associated with the database;
    multiplying each page request count by a page size of a buffer pool associated with that page;
    summing a result of the multiplying across all buffer pools;
    determining a page size of each table in the database; and
    multiplying a number of active pages in each table by the page size associated with that table.

5. The method of claim 1, wherein the set of accounting data is collected during a predefined time of day.

6. The method of claim 1, further comprising:
    generating a graph illustrating the set of query concurrency information.

7. The method of claim 1, wherein determining the set of query concurrency information comprises:
    sorting a set of start and end times associated with the plurality of queries.

8. An information processing system for characterizing workloads in a data warehouse system, the system comprising:
    a memory;
    a processor communicatively coupled to the memory; and
    a workload characterizer communicatively coupled to the memory and the processor, the workload characterizer configured to perform a method comprising:
    collecting a set of accounting data associated with a data warehouse system comprising at least one database;
    determining, based on the set of accounting data, a set of query concurrency information associated with the database, the set of query concurrency information identifying, for a plurality of queries, a number of queries executed on the database simultaneously and a duration of execution of such queries;
    determining, based on the set of accounting data, a set of processor utilization distribution information associated with the plurality of queries, wherein determining the set of processor utilization distribution information comprises
    determining, for each query, a processor access time associated with such query; and
    creating a sorted list comprising each of the processor access times, wherein each position of the sorted list corresponds to a processor utilization distribution percentile;

determining, based on the set of accounting data, a set of data access information indicating a quantity of data accessed by each query in the plurality of queries; and generating a workload profile associated with the database based on the set of query concurrency information, the set of processor utilization distribution information, and the set of data access information.

9. The information processing system claim 8, wherein determining the set of query concurrency information comprises:

counting a number of queries with start times smaller than a given first time unit and with end times larger than the first time unit.

10. The information processing system claim 8, wherein determining the set of data access information comprises at least:

recording a set of page request counts for each query associated with the database;

multiplying each page request count by a page size of a buffer pool associated with that page;

summing a result of the multiplying across all buffer pools;

determining a page size of each table in the database; and multiplying a number of active pages in each table by the page size associated with that table.

11. The information processing system claim 8, the method further comprising:

generating a graph illustrating the set of query concurrency information.

12. The information processing system claim 8, wherein determining the set of query concurrency information comprises:

sorting a set of start and end times associated with the plurality of queries.

13. A computer program product for characterizing workloads in a data warehouse system, the computer program product comprising:

a non-transitory storage medium readable by a processing circuit and storing instructions for execution by the processing circuit for performing a method comprising:

collecting a set of accounting data associated with a data warehouse system comprising at least one database;

determining, based on the set of accounting data, a set of query concurrency information associated with the database, the set of query concurrency information identifying, for a plurality of queries and for each of a plurality of time units over a period of time, a number of queries executed on the database simultaneously and a duration of execution of such queries, wherein the set of query concurrency information is determined based on at least comparing a start and end time of each query in the plurality of queries against each a start and end time of each remaining query in the plurality of queries;

determining, based on the set of accounting data, a set of processor utilization distribution information associated with the plurality of queries;

determining, based on the set of accounting data, a set of data access information indicating a quantity of data accessed by each query in the plurality of queries; and generating a workload profile associated with the database based on the set of query concurrency information, the set of processor utilization distribution information, and the set of data access information.

14. The computer program product of claim 13, wherein determining the set of query concurrency information further comprises:

counting a number of queries with start times smaller than a given first time unit and with end times larger than the first time unit.

15. The computer program product of claim 13, wherein determining the set of processor utilization distribution information comprises:

determining, for each query, a processor access time associated with such query; and creating a sorted list comprising each of the processor access times, wherein each position of the sorted list corresponds to a processor utilization distribution percentile.

16. The computer program product of claim 13, wherein determining the set of data access information comprises at least:

recording a set of page request counts for each query associated with the database;

multiplying each page request count by a page size of a buffer pool associated with that page;

summing a result of the multiplying across all buffer pools;

determining a page size of each table in the database; and multiplying a number of active pages in each table by the page size associated with that table.

17. The computer program product of claim 13, wherein the set of accounting data is collected during a predefined time of day.

18. The computer program product of claim 13, the method further comprising:

generating a graph illustrating the set of query concurrency information.

19. The computer program product of claim 13, wherein determining the set of query concurrency information comprises:

sorting a set of start and end times associated with the plurality of queries.

* * * * *